May 9, 1939.　　J. H. VICTOR ET AL　　2,157,102

REINFORCED LAMINATED GASKET

Filed Nov. 6, 1936

JOHN H. VICTOR
JOSEPH B. VICTOR
INVENTORS

PER *Albert J. Fihe*

ATTORNEY

Patented May 9, 1939

2,157,102

UNITED STATES PATENT OFFICE 2,157,102

REINFORCED LAMINATED GASKET

John H. Victor, Wilmette, and Joseph B. Victor, Oak Park, Ill., assignors to Victor Manufacturing & Gasket Company, Chicago, Ill., a corporation of Illinois Application November 6, 1936, Serial No. 109,500

2 Claims. (Cl. 288—1)

This invention relates to an improved reinforced laminated gasket, and has, for one of its principal objects, the provision of a laminated gasket, particularly for automobile engines and the like, which shall be mainly composed of laminations of relatively soft material but which shall also include one or more layers of a softer packing material such as asbestos or the like.

One of the important objects of this invention is to provide a gasket which shall be particularly well adapted for use in internal combustion engines, especially those of the modern high compression type, and which shall be so constructed as to provide a satisfactory and efficient seal against the escape of combustion gases, particularly when this gasket is inserted between the cylinder head and block of such an automobile engine.

A still further object of the invention is to provide, in a cylinder head gasket or the like which comprises a series of laminations of metal and asbestos, means for reinforcing the gasket at the weakest points, namely, the spaces between adjacent cylinder openings.

Another and further important object of the invention is to provide, in a laminated gasket, means whereby the same will always remain flat while, at the same time, reinforcing the structure with extra layers of metal around the cylinder openings where the highest temperatures occur.

Other and further important objects of the invention will be apparent from the disclosures in the accompanying drawing and following specification.

The invention, in a preferred form, is shown in the drawing and hereinafter more fully described.

Figure 1:
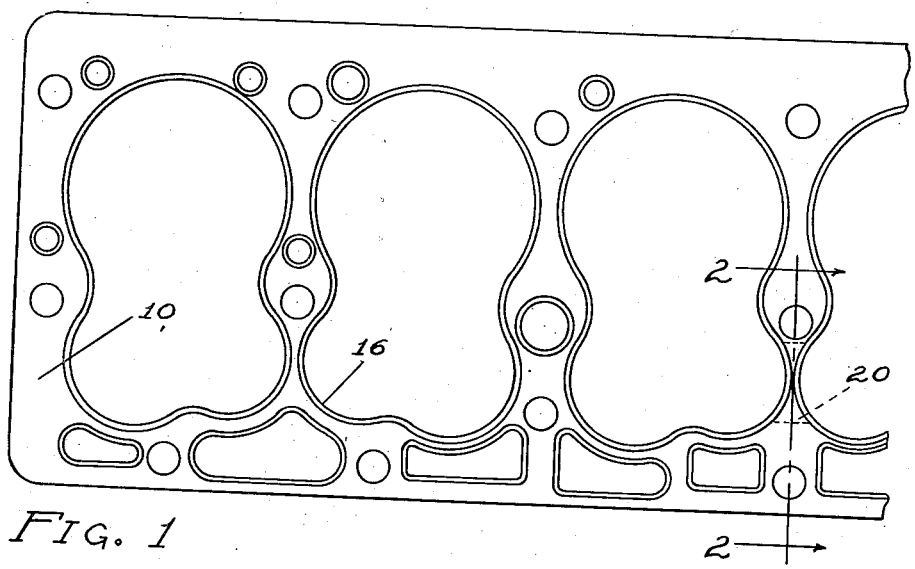
Figure 1 is a top plan view of a representative gasket of the improved construction of this invention.
Figure 2:
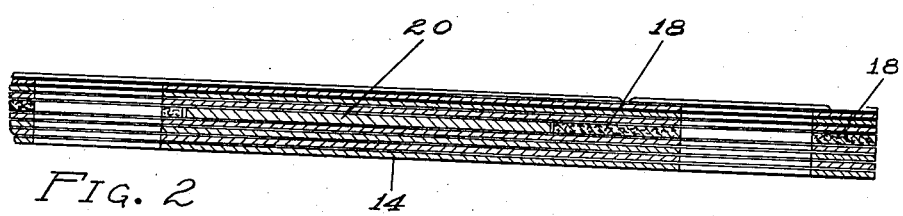
Figure 2 is an enlarged sectional view taken on the line 2—2 of Figure 1.

In the production of laminated gaskets, particularly of the all-metal or practically all-metal type, one of the main problems encountered has been to retain the laminations or layers of metal and other material in desired position and in relationship to each other so as to provide a unitary gasket structure while, at the same time, retaining the over-all flat appearance and uniform thickness which is desirable in constructions of this type. Obviously, turning up flanges from the lower layer or lamination of metal and bending the same into gripping relationship with the upper layers will provide both a suitable securing means for all the layers, and further, if these flanges are around the combustion openings, will produce an additional reinforcement against blow-outs. However, this construction built up too heavy or too thick a wall around the combustion chamber openings with the result that these parts were unduly compressed when the gasket was installed, and the other portions were not sufficiently held so as to produce a tight fit. The object of the present invention is to eliminate such uneven thickness by cutting away a portion of one of the laminations and also by other expedients, as by making the layer of asbestos thicker than the metal layers, the asbestos being more likely to become deformed or to yield under pressure. The reference numeral 10 indicates generally the body of the improved laminated gasket of this invention, the same comprising a series of metal layers as best shown in Figure 2, the bottom layer 14 having certain of its edges turned up into the shape of flanges as illustrated at 16 in Figure 1. These flanges are then bent downwardly over the edges of the adjacent upper layer, thereby providing a unitary construction which is properly clinched and held in position.

In order to insure a flat structure of uniform thickness and also to provide for more resiliency, an inner layer of asbestos or the like 18 is provided which is preferably of a slightly greater thickness than the thickness of the metal laminations and which, of course, will yield or compress more easily when the gasket is installed and the cylinder-head bolts are tightened.

It has been found in practice, however, that this layer of asbestos, if cut too thin, will break or collapse either in installation or use, and to remedy this situation, a shim of metal of the desired contour and thickness is inserted into positions wherever considered necessary or desirable, the layer of asbestos being cut away at these points. One such installation is illustrated at 20 in Figure 1, the section of the same being accordingly shown in Figure 2 wherein the metal shim replaces the asbestos layer 18 over a certain portion of its extent, particularly the narrow space between two cylinder openings as shown.

Figure 3:
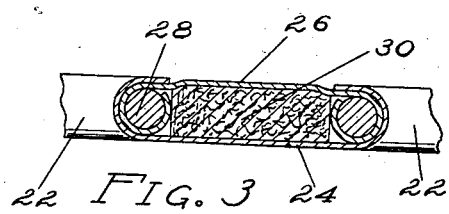
Figure 3 is a sectional view showing a modified form of the invention.

A further embodiment of the invention is illustrated in Figure 3 wherein the cylinder openings 22 are formed by turning up a flange from the bottom metal layer 24 and also by turning down a flange from the top metal layer 26 about a supporting or reinforcing rod or the like 28, and in between the layers 24 and 26, a layer of asbestos or the like 30 is provided. In this manner, a very considerable thickness of metal is provided at and around the cylinder openings, thereby effectively preventing blow-outs or burnouts while, at the same time, a desired resiliency of the gasket is assured.

Figure 4:
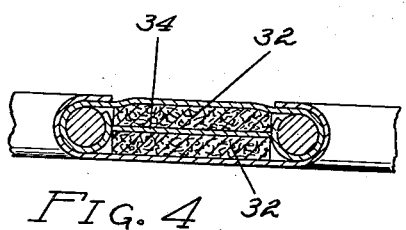
Figure 4 is a sectional view similar to Figure 3 illustrating a further modification.

A slight modification of the structure shown in Figure 3 is illustrated in Figure 4 wherein the inner packing comprises two layers of asbestos 32 with an intermediate metal layer 34 therebetween. The remaining structure is substantially the same as that shown in Figure 3.

Figure 5:
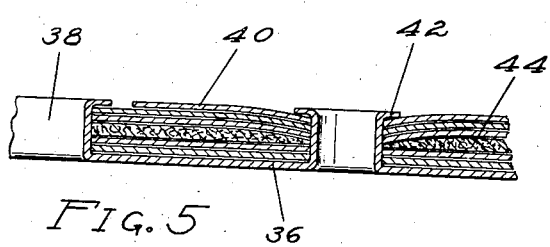
Figure 5 is also an enlarged sectional view, showing another modified form of the invention.

In Figure 5 is shown a form of the invention wherein undesirable thickness around the cylinder openings is eliminated, the lower lamination of metal 36 having a flange 38 turned upwardly therefrom around such cylinder opening, which flange grips all but the top layer 40 of the metal and other laminations. The top layer 40 is cut away at a point just short of the inner edge of the flange 38 so that a flush construction of uniform thickness results.

Flanges are also struck upwardly from the lower layer 36 to form water or bolt openings as illustrated at 42, and these flanges are employed to grip the top layer 40 and hold it in position with regard to the gasket and the other laminations. This holding is done mainly by compressing the asbestos layer 44 as shown.

It will be evident that herein is provided a cylinder-head gasket which provides additional and satisfactory reinforcement around the combustion chamber openings by presenting a plurality of layers of metal thickness at these points, thereby insuring against blow-outs or burn-outs, while, at the same time, retaining desired uniformity of thickness throughout the area of the gasket.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A gasket, having openings therethrough and comprising upper and lower layers of metal, two intermediate layers of resilient packing material between said upper and lower layers, a middle metallic layer between the resilient layers, and means extending about and reinforcing the openings, said means comprising flanges on the upper and lower metallic layers and a metallic rod, the flange of the upper metallic layer encircling said rod and the flange of the lower layer encircling the rod and the corresponding portion of the upper layer.

2. A laminated gasket, including upper and lower metallic layers, and at least two layers of resilient packing material therebetween, with a third metallic layer between the resilient layers and means for joining the laminations together, said means comprising flanges around the water openings of the gasket, a reinforcement for the flanges, comprising a rod of a diameter slightly less than the gasket thickness, the upper edges of the flanges being countersunk flush with the gasket surfaces and encompassing the rod, and said flanges being integral with both the top and bottom metallic layers of the gasket.

JOHN H. VICTOR.
JOSEPH B. VICTOR.